US012705141B2

(12) United States Patent
Brajković et al.

(10) Patent No.: US 12,705,141 B2
(45) Date of Patent: Aug. 11, 2026

(54) DISCOVERY OF SERVICES IN COMBINATION WITH ENABLING DATA PROTECTION AND OTHER WORKFLOWS

(71) Applicant: HYCU, Inc., Boston, MA (US)

(72) Inventors: Mladen Brajković, Ljubljana (SI); Antal Nemeš, Ljubljana (SI)

(73) Assignee: HYCU, INC., Boston, MA (US)

(*) Notice: Subject to any disclaimer, the term of this patent is extended or adjusted under 35 U.S.C. 154(b) by 0 days.

(21) Appl. No.: 18/426,535

(22) Filed: Jan. 30, 2024

(65) Prior Publication Data

US 2024/0281341 A1 Aug. 22, 2024

Related U.S. Application Data

(60) Provisional application No. 63/442,138, filed on Jan. 31, 2023.

(51) Int. Cl.
*G06F 11/1446* (2026.01)

(52) U.S. Cl.
CPC ...... *G06F 11/1464* (2013.01); *G06F 2201/84* (2013.01)

(58) Field of Classification Search
CPC .................................................. G06F 11/1464
See application file for complete search history.

(56) References Cited

U.S. PATENT DOCUMENTS 10,402,090 B1 9/2019 Tsaur et al.
11,303,659 B2 4/2022 Yu et al.
11,416,641 B2 8/2022 Narayanaswamy
12,314,430 B1 5/2025 Hardt
2007/0168715 A1* 7/2007 Herz .................. G06F 11/1461 714/13
2010/0332401 A1 12/2010 Prahlad et al.
2013/0152047 A1 6/2013 Moorthi et al.
2015/0135302 A1* 5/2015 Cohen .................. G06F 21/128 726/12
2016/0019033 A1 1/2016 Ebner et al.
2016/0072831 A1 3/2016 Rieke
2016/0330080 A1* 11/2016 Bhatia .................. H04L 41/122
2017/0149624 A1 5/2017 Chitti et al.
2017/0185488 A1* 6/2017 Kumarasamy ...... G06F 11/2038
2018/0040256 A1 2/2018 Alvarez et al.

(Continued)

FOREIGN PATENT DOCUMENTS

EP 3528454 A1 * 8/2019 ............. G06F 16/86
WO 2020106973 A1 5/2020

OTHER PUBLICATIONS

PCT/US24/13443 Search Report and Written Opinion, dated Jun. 24, 2024 (13 pages).

*Primary Examiner* — Apu M Mofiz
*Assistant Examiner* — Farhad Agharahimi
(74) *Attorney, Agent, or Firm* — David J. Thibodeau; VLP Law Group LLP

(57) ABSTRACT

An automatic process for discovering as service, such as a Software as a Service (SaaS), leverages a user authentication service such as a Single Sign On (SSO) service. Automatic service discovery can be triggered either as a scheduled job or as a response to an external event (for example, when a new virtual SaaS service is integrated within an SSO). The only action required by the user is to provide service access credentials for the discovery process to access the remote service(s).

16 Claims, 4 Drawing Sheets

(56) References Cited

U.S. PATENT DOCUMENTS

2018/0314457 A1 11/2018 Bender et al.
2018/0341666 A1* 11/2018 Lee .................... G06F 11/1464
2019/0036910 A1 1/2019 Choyi et al.
2019/0140914 A1 5/2019 Maes
2019/0207968 A1 7/2019 Heckman et al.
2019/0303961 A1 10/2019 Patankar et al.
2019/0319860 A1* 10/2019 Seed .................. H04L 41/0806
2019/0332485 A1 10/2019 Gill et al.
2019/0342307 A1 11/2019 Gamble et al.
2020/0137097 A1 4/2020 Zimmermann et al.
2020/0244673 A1 7/2020 Stockdale et al.
2021/0203684 A1 7/2021 Maor et al.
2022/0191230 A1 6/2022 Morgan
2022/0318059 A1 10/2022 Cook et al.

* cited by examiner

DISCOVERY OF SERVICES IN COMBINATION WITH ENABLING DATA PROTECTION AND OTHER WORKFLOWS

CROSS REFERENCE TO RELATED APPLICATIONS

This patent application claims priority to:

U.S. Provisional Patent Appl. No. 63/442,138 entitled "DISCOVERY OF SERVICES IN COMBINATION WITH ENABLING DATA PROTECTION AND OTHER WORKFLOWS, Filed Jan. 31, 2023;

U.S. Provisional Patent Appl. No. 63/442,139 entitled R-GRAPH PROPAGATION OF DATA PROTECTION AND COMPLIANCE STATUSES, Filed: Jan. 31, 2023; and U.S. Provisional Patent Appl. No. 63/442,140 entitled API MODEL FOR AS-A-SERVICE DATA RESILIENCE MANAGEMENT Filed: Jan. 31, 2023;

the entire contents of each of which are hereby incorporated by reference.

TECHNICAL FIELD

This patent application relates to implementing data protection for cloud services (e.g., SaaS, PaaS, DBaaS, IaaS).

BACKGROUND

Data protection is the process of safeguarding important information from corruption, compromise, or loss. Enterprises such as businesses, organizations, universities and other large groups of users also have little tolerance for downtime that can make it impossible to keep the enterprise running.

Consequently, a large part of a data protection strategy is ensuring that data can be restored quickly after any corruption or loss. Protecting data from compromise and ensuring data privacy are other key components of data protection.

As data moves to cloud and edge applications, enterprises must adapt. With the increasing sophistication of security attacks, and as the data environment changes, relying on legacy data protection technologies makes adaptation complex and expensive to manage and operate.

Cloud Services (e.g., SaaS (software as a service), PaaS (Platform as a Service), DBaaS (Database as a Service, IaaS (Infrastructure as a Service)) have become an integral part of many business computing environments. The advantages of these cloud services are well known and include the ability to scale to meet demand as needed, and to only pay for what is needed. Cloud services also reduce the need for expensive and time-consuming maintenance of applications. With these "as-a-Service" deployments, the service provider may itself provide for data backup and maintenance, including data protection, which frees the business' own staff from complex software and hardware management.

Data Protection as a Service allows organizations to reduce risk and shift from owning and maintaining backup infrastructure to simply accessing and utilizing it in a pay-as-you-go model. They choose how much compute, networking, and storage they might need based on previous workloads, with the ability to scale when demand changes. They also specify encryption, retention, and security policies as part of their lease and leave backup storage planning and deployment to the data protection vendor.

SUMMARY

The approach to data protection described herein leverages an Identity Provider (IdP) service to discover SaaS/DBaasS/PaaS or other services, and then automatically applies an appropriate data protection scheme for such services.

More particularly, the approach brings a new level of SaaS awareness to the modern and complex multi-cloud environments by enabling automatic detection of SaaS services that are hosted outside of company infrastructure and to then interact with them. Such interactions may include, for example, confirming how data protection attributes are configured or other interactions.

The automatic SaaS discovery process leverages a user authentication service such as an Identity Provider (IdP) service. Automatic SaaS discovery can be triggered either as a scheduled job or as a response to an external event (for example, when a new virtual SaaS service is integrated within IdP Single Sign One (SSO) service). The only action required by the user is to provide IdP credentials for the discovery process to access the remote IdP service(s). As a result, end users are able to connect to their identity management provider(s), which will then automatically gather the SaaS/DPaaS/PaaS services used by their organization.

An Application Data catalog is then leveraged to automatically categorize the SaaS/DPaaS/PaaS, determine a method required to understand the current protection status, and to then deploy the appropriate data protection primitives—all of this without the user having to engage in manual operations.

DETAILED DESCRIPTION OF EXAMPLE EMBODIMENTS

First Phase of Discovery

Figure 1:
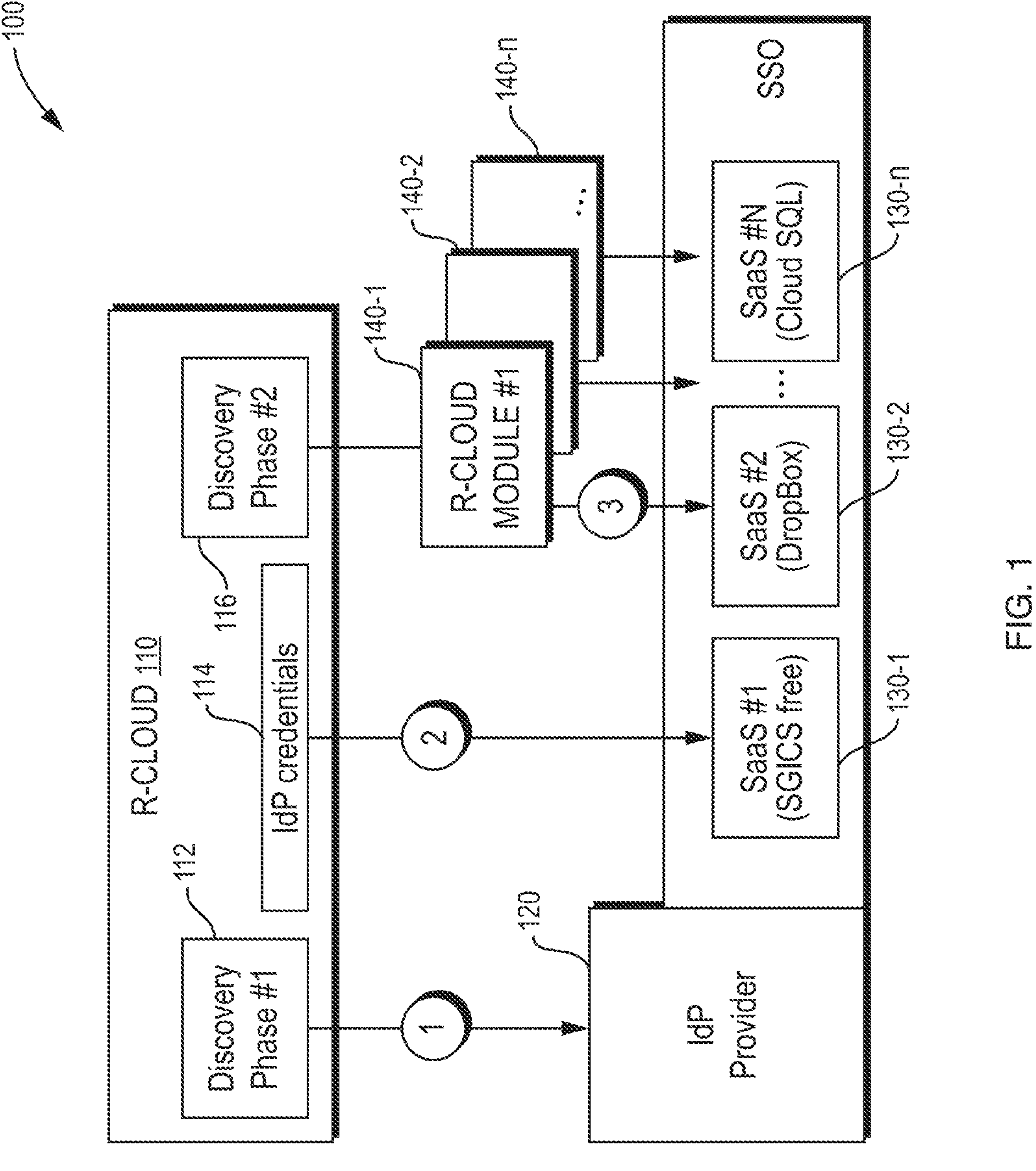
FIG. 1 is an overview of an example SaaS awareness implementation.

FIG. 1 illustrates an example data processing environment 100 where a process for automated discovery of SaaS services and/or applications may be implemented. The environment 100 may be a typical enterprise such as a business, university, organization, or other group of individual users that access a set of SaaS services and/or applications 130-1, 130-2, . . . , 130-*n*. For example, the SaaS services 130 may include sSalesForce, CloudSQL, DropBox and other SaaS services/applications. It should be understood however that other enterprises are different and that different or additional SaaS services/applications 130 may be deployed.

The enterprise utilizes an Identity Provider (IdP) service 120, such as one using Single Sign On (SSO) (like Okta or Azure AD (Entra)), to control access to the SaaS services and/or applications 130. SSO and similar IdP services 120 permit each user to use one set of login credentials—for example, a username and password to access multiple SaaS services/applications 130 and simplify the management of multiple login credentials.

In this example, the SaaS awareness function (referred herein to as the "R-Cloud Platform 110) accesses the IdP 120 to retrieve access credentials needed to in turn access the SaaS 130-1, 130-2, . . . , 130*n*. With such access, the R-Cloud Platform 110 is then able to discover which SaaS services are in use by the enterprise and their configuration details. Resources discovery may be developed and maintained in different ways such as via Simple Network Management Protocol (SNMP), Common Information Model (CIM), or other methods that define how the managed resources in an IT environment 102 are represented as a common set of objects and relationships between them. This status information may be automatically discovered via agents, plug-ins, via Application Programming Interfaces (APIs) and the like installed in the managed resources.

The R-Cloud Platform 110 may perform the following operations:

- Remotely detecting if a SaaS service 130 is provisioned and running (SaaS service discovery).
- Remotely detecting details about the SaaS service 130 (for example, the version of the service, the identification of logical entities within the SaaS services, respective data and metadata hosted within the service 130, and so on).
- Remotely detecting storage consumption of the service 130 (if available).
- Remotely detecting number of provisioned/subscribed users.

To provide SaaS awareness, an R-Cloud Module 140-1, 140-2, **140-*n* (also called a plug-in) should be specifically designed for each SaaS service 130-1, 130-2, . . . , 130*n*. R-Cloud Platform 110 exposes a set of interfaces that can prove different data types in use by the service, and to preferably enforce a common hierarchy and uniformity of SaaS-specific implementations within different R-Cloud Modules 140. For example, there may be an R-Cloud Module 140-1 for Salesforce, a different R-Cloud Module 140-2** for Dropbox, etc. The internal implementation for each R-Cloud Module's application probe can be done in any way that best suits the needs of the particular SaaS service.

The R-Cloud Modules 140 may be deployed as an application running within the enterprise or as an external service. The modules can thus be deployed in two modes:

- within the customer (e.g., enterprise) environment
- within a dedicated environment for each customer on backend hosted by the provider of the SaaS awareness service.

The first or discovery stage 112 of SaaS awareness therefore consists of remotely detecting if a SaaS service 130 is integrated within the customer environment. This can be done by leveraging the IdP 120 Single Sign On (SSO) service used by the enterprise. Example SSOs may include OKTA and Azure. On OKTA and Azure AD, this information can be retrieved through respective REST APIs.

Figure 2:
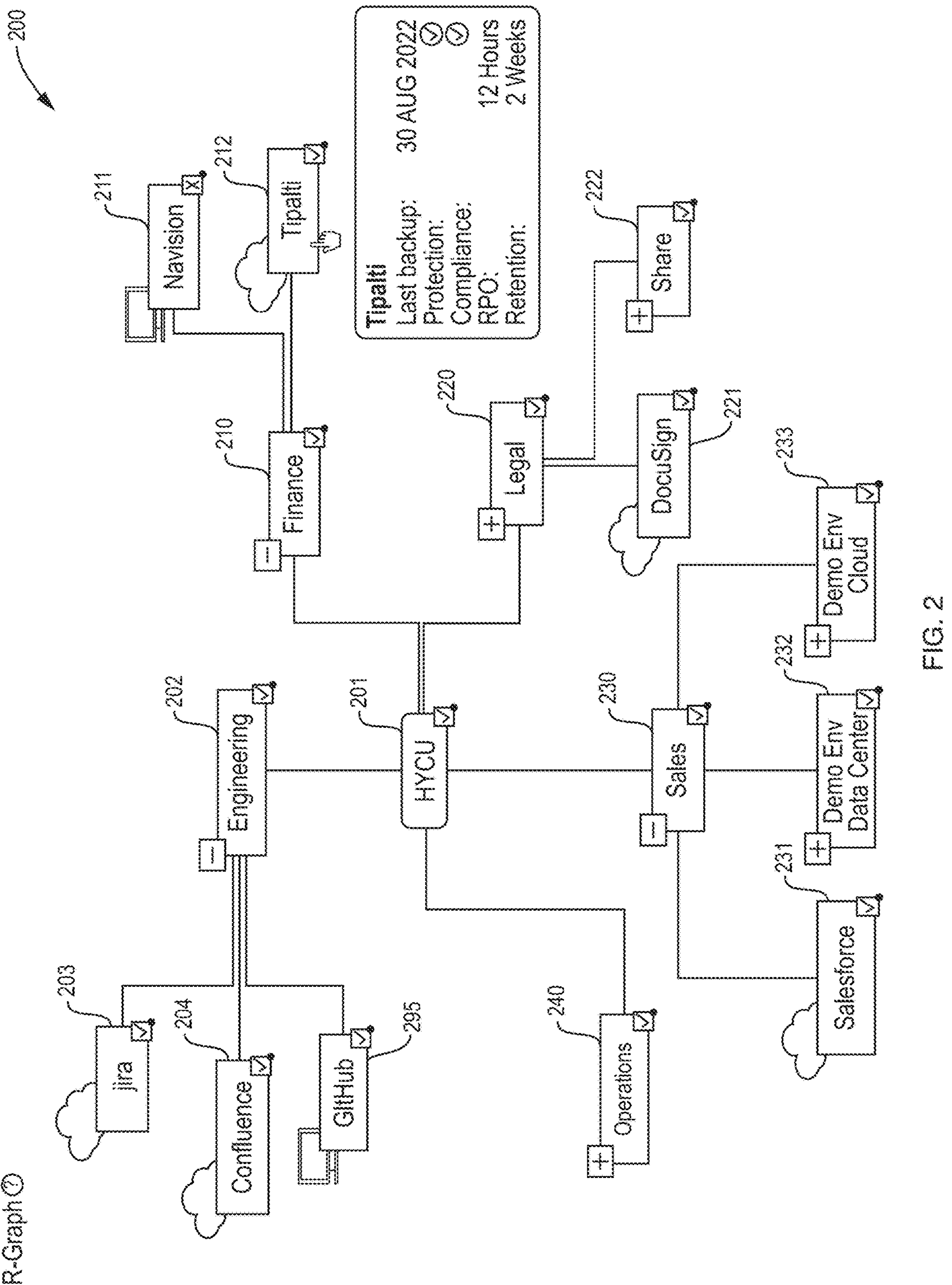
FIG. 2 is an example of discovered SaaS services/applications.

FIG. 2 is an example map of resulting discovered SaaS services. If the SaaS service is not integrated within the customer's SSO service, it can instead be added manually via a user interface to the list of discovered SaaS services.

The list of discovered services/applications may carry attributes such as a "name" associated with each service, and a graphically indicated status of various features such as compliance of the service, such as protection and discovery. In this example, information reflected the discovered services is arranged in a tree referred to herein as an R-graph 200. The R-graph shows that an enterprise called HYCU uses a mix of Software as a Service (Saas) resources and hosted resources among different departments. Here an Engineering department 202 uses Jira 203, Confluence 204, and GitHub 205 services they access as SaaS; the Finance Department 210 uses Navision 211 and Tipalti 212; Legal 220 uses Docusign 221 and a shared data repository 222; the Sales Department 230 uses SalesForce 232, and a couple of hosted resources (a Demo Data Center 234 and Demo Cloud 236), and Operations 240 does not yet have any managed resources.

Second Phase of Discovery

The second stage of SaaS data protection awareness involves gathering SaaS-application-specific information. These attributes may be discovered during a LIST operation (implemented by each R-Cloud Module 140) on the respective SaaS-application 140.

The R-Cloud Platform 110 includes a service data management function that discovers service attributes, stores them, and then uses that information to drive backup and restore workflows and optional attributes.

Figure 3:
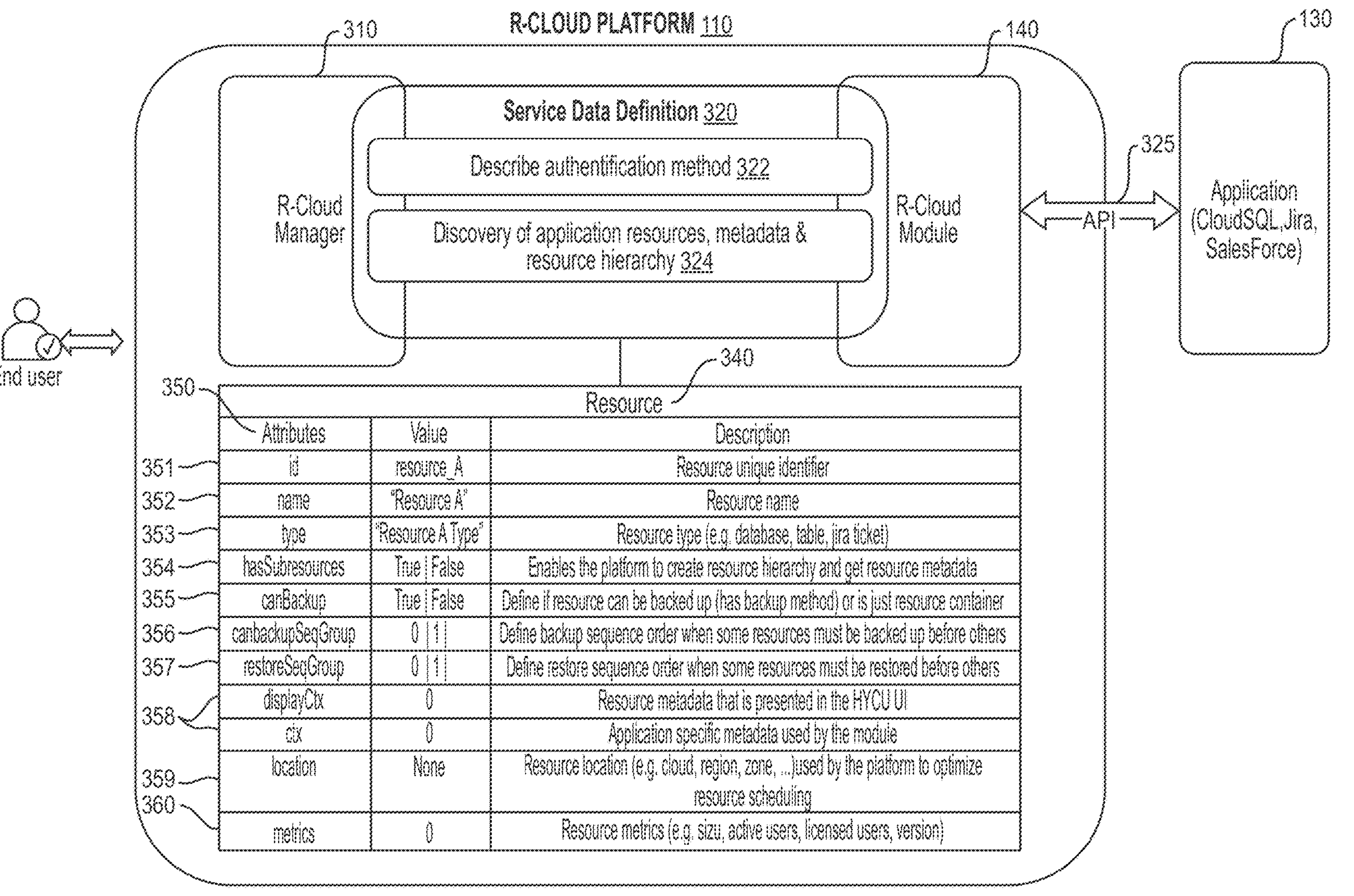
FIG. 3 is an overview of an example core data structure for SaaS-service/application discovery.

FIG. 3 is an overview of an example core data structure that may be used by the R-Cloud Platform 110 to implement SaaS service/application discovery. In general, data protection-focused discovery of a SaaS 140 is performed to determine if it has a corresponding backup method, restore method, configuration method, status method, and other information, such as lists of required attributes and optional attributes. The specifics of each method and list of attributes differs depending on the type of SaaS 140.

More particularly, the R-Cloud Platform 110 includes an R-Cloud Manager 310 component, a Service Data Definition 320, and the R-Cloud Modules 140. Each R-Cloud Module 140 is programmed to access its associated SaaS application 130 such as through an Application Programming Interface (API) 325. There is a different API 325 for each SaaS 130.

The Service Data Definition consists of resource objects 340 which correspond to the attributes 350 of a corresponding discovered SaaS application 130. These attributes may be discovered such as during a LIST operation on the SaaS-application. Each such LIST operation may return a list that describes certain aspects of the structure of the SaaS application. The structure may identify a list of required attributes that the R-Cloud platform 110 will then use to drive backup and restore methods, as well as an optional list of attributes that are meaningful only to the module.

As shown in FIG. 3, these discovered attributes 350 may include values for an identifier 351, name 352, and type 353 of the SaaS 130. Also included are attributes such as whether or not the SaaS has other related dependent services or subservient services 354, provides its own backup method 355, defines a backup sequence 356, or defines a restore sequence 357. Still other attributes may include whether the SaaS can display metadata 358, its location 359, and other metrics 360.

As a result, the R-Cloud Platform 110 has now discovered the extent of the default data protection built into a Service application 130. This allows the end users to quickly determine what is already present in the environment 100 and what additional data protection they may desire.

An example of a data protection attribute is the »canBackup« attribute. This indicates to the R-Cloud platform 110 whether a SaaS implements its own backup method.

Example optional attributes may further define the »canBackup« attribute to specify one or more levels of a hierarchy at which the backup protection can be deployed. For an example CloudSQL SaaS, the »hasSubResources« can be set to True. The child resources may be further defined as optional attributes, such as a list of cloud SQL servers, a list of of SQL instances are running on each server, a list of databases running on each SQL instance, and a list of tables in each database. The optional attributes may further specify a »canBackup« attribute for each discovered object. For example, it can determine whether each discovered server, instance, database, and table can or cannot itself be backed up by the SaaS at its corresponding level.

Similarly, optional child attributes of a DropBox SaaS may include a file structure hierarchy including top level personal/public/shared folders, a subfolder under each such top level folder, and then files within each subfolder. The optional attributes may thus specify whether this particular DropBox resource can be backed up, or not, at each level of the top level/subfolder/file hierarchy.

The child attributes therefore enable adaption of the discovery service to be customized to different use cases.

The configuration method may include configuration options and User Interface (UI) attributes (such as access credentials) for implementing the actual backup and resource methods.

Figure 4:
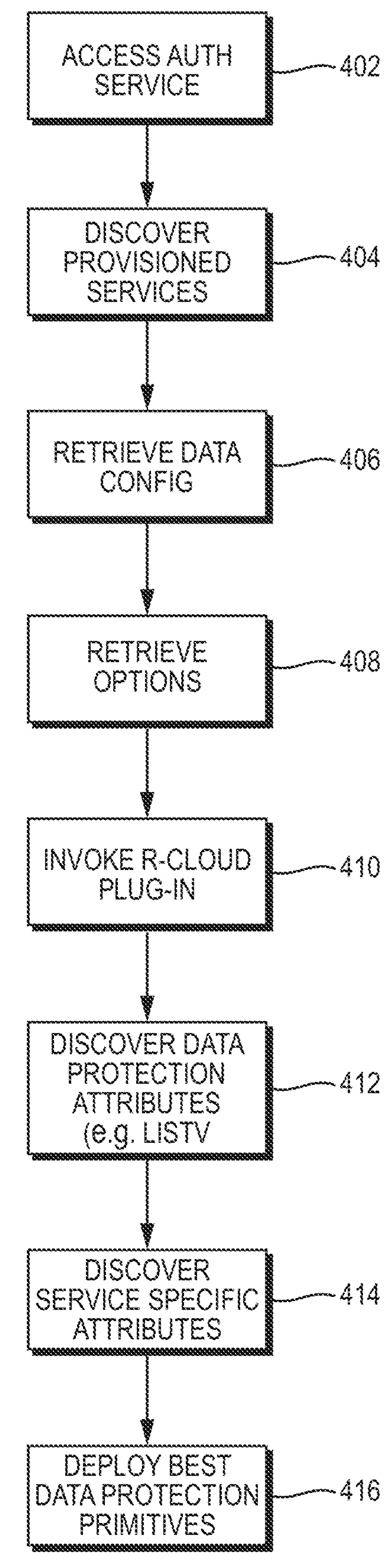
FIG. 4 is a flow diagram for an automated discovery and data protection process.

FIG. 4 is a high level flow chart for an example automated service discovery and data protection process that may be implemented within the system above.

In a first step 402, access is provided to a Identity Provider (IdP) service.

In a next step 404, that IdP service is queried to automatically discover the services that have been provisioned in the environment.

In step 406, further details about the data configuration for each service is discovered. As explained above, this may include determining the service version, identification of logical entities within the service, or respective data and metadata being hosted within the service.

Further attributes of the service can also be retrieved in step 408. As explained above, this may include things such as storage consumption, the number of subscribed users, and other attributes that may assist with data protection.

The remaining steps are typically carried out by an R-cloud module 140 that is specifically designed for each service 130.

As explained above, an R-cloud module 140-1 for a SQL database service will perform different functions from an R-cloud module 140-2 for a Dropbox service.

At this point, such as at step 410, an appropriate R-Cloud module for each service is invoked to discover service-specific attributes.

As explained above this second stage of discovery determines, for example in step 412, the data protection attributes of each service, such as whether the service has a >>can_backup<< attribute.

Additional attributes of the user's configuration of each service are then discovered in step 414. As explained for the examples above, if the service is a SQL database service then information regarding parent-child databases can be retrieved, whether each database can be backed up or restored, or to what extent backup and restore operations can be handled by the service.

As a final step 416 for each service, the appropriate data protection primitives are enabled—either as made available by the service or as separately configured for the enterprise.

Further Implementation Options

It should be understood that the workflow of the example embodiments described above may be implemented in many different ways. In some instances, the various "data processors" may each be implemented by a physical or virtual or cloud-based general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., one or more central processing units, disks, various memories, input/output ports, network ports, etc.) that enables the transfer of information between the elements. One or more central processor units are attached to the system bus and provide for the execution of computer instructions. Also attached to system bus are typically I/O device interfaces for connecting the disks, memories, and various input and output devices. Network interface(s) allow connections to various other devices attached to a network. One or more memories provide volatile and/or non-volatile storage for computer software instructions and data used to implement an embodiment. Disks or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

Embodiments may also leverage cloud or other remote data processing services such as Amazon Web Services, Google Cloud Platform, and similar tools. However the services may also be locally hosted.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The above description has particularly shown and described example embodiments. However, it will be understood by those skilled in the art that various changes in form and details may be made therein without departing from the legal scope of this patent as encompassed by the appended claims.

The invention claimed is:

1. An automatic Software as a Service (SaaS) resource discovery method comprising:
- accessing an Identity Provider (IdP) service to initially obtain access credentials for the SaaS resource;
- accessing the SaaS resource using the access credentials;
- invoking a service-specific discovery method to issue one or more service-specific operations via an API of the SaaS resource for further discovering-resiliency-related data protection attributes specific to the SaaS resource, and wherein such resiliency-related data protection attributes comprise information indicative of one or more of:
- a can backup capability,
- recovery readiness,
- restore configuration, or
- inclusion in a backup or restore sequencing group,
- and wherein, for a hierarchical SaaS resource having at least two levels, the resiliency-related data protection attributes indicate at which levels the resiliency-related data protection attributes are supported by functions of the SaaS resource itself.

2. The method of claim 1 wherein the method is triggered either as a scheduled job or when a new SaaS is integrated with the identity service or when initiated by a user or a service.

3. The method of claim 1 where the identity service is a Single Sign On (SSO) service.

4. The method of claim 1 wherein the resiliency-related data protection attributes further comprise information specific to whether the SaaS resource includes one or more of a backup method, a default data protection built into the service, recovery resource method, recovery status method, or a recovery configuration method.

5. The method of claim 1 additionally wherein:
- discovering resiliency-related data protection attributes specific to the SaaS resource further includes discovering one or more of hasChildResources, backupSeqGroup, or restoreSeqGroup.

6. The method of claim 1 wherein
- accessing the IdP service obtains access for two or more SaaS resources; and
- discovering resiliency-related data protection attributes utilizes a different service-specific discovery method for at least two of the two or more SaaS resources.

7. An apparatus, comprising:
- a hardware processor; and
- computer memory holding computer program instructions executed by the hardware processor for Software as a Service (SaaS) resource discovery and data protection configuration, the computer program instructions configured for:
- accessing an identity provider (IdP) service to initially obtain access credentials for the SaaS resource;
- accessing the SaaS resource using the access credentials; and
- invoking a service-specific discovery method to issue one or more service-specific operations via an API of the SaaS resource for discovering resiliency-related data protection attributes specific to the SaaS resource, and wherein such resiliency-related data protection attributes comprise information indicative of one or more of:
- a can backup capability,
- recovery readiness,
- restore configuration, or
- inclusion in a backup or restore sequencing group,
- and wherein, for a hierarchical SaaS resource having at least two levels, the resiliency-related data protection attributes indicate at which levels the resiliency-related data protection attributes are supported by functions of the SaaS resource itself.

8. A computer program product in a non-transitory computer readable medium for Software as a Service (SaaS) resource discovery and data protection configuration, the computer program product holding computer program instructions that, when executed by a data processing system, is configured for:
- a. accessing an identity provider (IdP) service to initially obtain access credentials for the SaaS resource;
- b. accessing the SaaS resource using the access credentials; and
- c. invoking a service-specific discovery module to issue one or more service-specific operations via an API of the SaaS resource for further discovering resiliency-related data protection attributes specific to the SaaS resource, and wherein such resiliency-related data protection attributes comprise information indicative of one or more of:
- a can backup capability,
- recovery readiness,
- restore configuration, or
- inclusion in a backup or restore sequencing group,
- and wherein, for a hierarchical SaaS resource having at least two levels, the resiliency-related data protection attributes indicate at which levels the resiliency-related data protection attributes are supported by functions of the SaaS resource itself.

9. The computer program product of claim 8 further configured to be triggered either as a scheduled job or when a new SaaS is integrated with the identity service or when initiated by a user or a service.

10. The computer program product of claim 8 where the identity service is a Single Sign On (SSO) service.

11. The computer program product of claim 8 wherein the resiliency-related data protection attributes further comprise information specific to whether the SaaS resource includes one or more of a backup method, a default data protection built into the service, recovery resource method, recovery status method, or recovery configuration method.

12. The computer program product of claim 8 further configured for:
- discovering resiliency-related data protection attributes specific to the SaaS resource including discovering one or more of default data resiliency, canBackup, hasChildResources, backupSeqGroup, or restoreSeqGroup.

13. The computer program product of claim 8 wherein the attributes include a canBackup attribute, the resource is a hierarchical resource having at least two levels, and the canBackup indicates one or more levels of the hierarchy resource for which backup is implemented by the service.

14. The computer program product of claim 8 further configured for:

accessing the IdP service obtains access for two or more SaaS resources; and discovering data resiliency attributes utilizes a different service-specific discovery method for at least two of the two or more SaaS resources.

15. The method of claim 1, wherein the discovery of SaaS resources is initiated by querying the Identity Provider (IdP) for a list of authenticated SaaS services associated with a tenant identity.

16. The computer program product of claim 8, wherein the discovery of SaaS resources is initiated by querying the Identity Provider (IdP) for a list of authenticated SaaS services associated with a tenant identity.

* * * * *